G. E. BATES.
DIRECTION INDICATOR FOR MOTOR VEHICLES.
APPLICATION FILED OCT. 11, 1918.
1,355,528.
Patented Oct. 12, 1920.
2 SHEETS—SHEET 1.
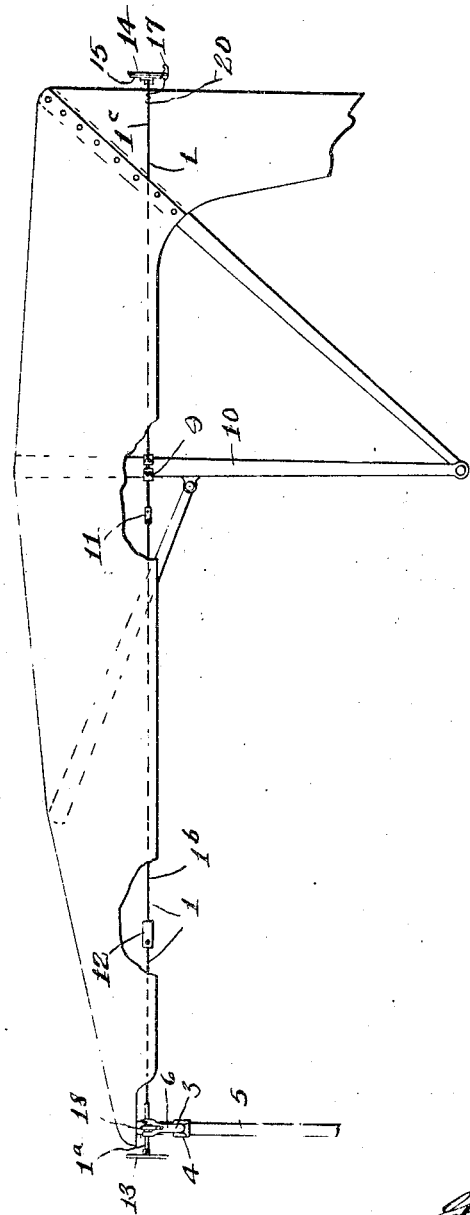
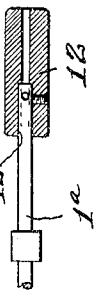
INVENTOR.
George E. Bates.
BY Parsons & Codell
ATTORNEYS

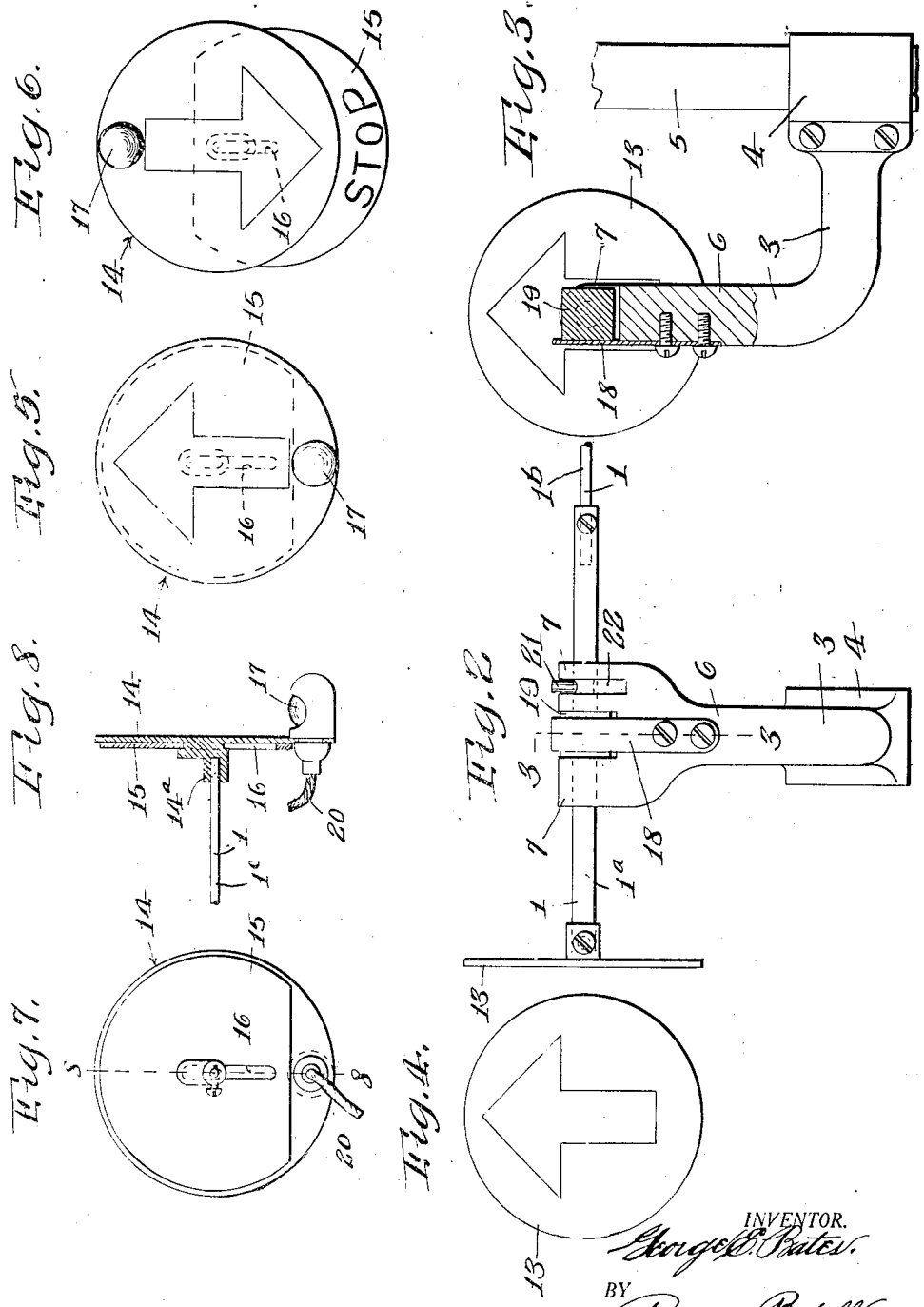

UNITED STATES PATENT OFFICE.

GEORGE E. BATES, OF SYRACUSE, NEW YORK.

DIRECTION-INDICATOR FOR MOTOR-VEHICLES.

1,355,528.  Specification of Letters Patent.  Patented Oct. 12, 1920.

Application filed October 11, 1918. Serial No. 257,789.

*To all whom it may concern:*

Be it known that I, GEORGE E. BATES, a citizen of the United States, and a resident of Syracuse, in the county of Onondaga and State of New York, have invented a certain new and useful Direction-Indicator for Motor-Vehicles, of which the following is a specification.

This invention has for its object a particularly simple and efficient direction indicator for motor vehicles which is self-contained and readily attachable to the motor vehicle and highly efficient and durable in use.

The invention consists in the novel features and in the combinations and constructions hereinafter set forth and claimed.

In describing this invention, reference is had to the accompanying drawings, in which like characters designate corresponding parts in all of the views.

Figure 1 is a fragmentary side elevation of the top of the vehicle body provided with my invention.

Fig. 2 is an enlarged side elevation of the front section of the shaft of the indicator and the indicator member mounted thereon, and the bracket in which said shaft section is mounted.

Fig. 3 is a vertical sectional view on line 3—3, Fig. 2, the contiguous portion of the front wall or wind-shield of the motor vehicle being also shown.

Fig. 4 is a face view of the front indicator member.

Fig. 5 is a face view of the rear indicator member.

Fig. 6 is a face view of the rear indicator member when the stop signal is in its operative position.

Fig. 7 is a rear elevation of the rear indicator member.

Fig. 8 is a sectional view on line 8—8, Fig. 7.

Fig. 9 is an enlarged detail view of the bearing for the shaft of the indicator, which bearing is mounted on one of the bows of the folding top, the contiguous part of the shaft and bow being also shown.

Fig. 10 is a detail view of the coupling connecting two of the shaft sections; and Fig. 11 is a detail view of the handle for operating the shaft.

This direction indicating means comprises a shaft mountable in the top of the motor vehicle whether the top is a permanent top or a folding top, and indicating members mounted on the front and rear ends of the shaft, the shaft being movable to change the position of the indicating members. Preferably the shaft is movable about an axis and rocks the indicating members into different positions and the indicating members are supported wholly by the shaft.

The combined indicator and background plates are arranged in vertical planes and have direction indicating characters on their exposed faces and these plates which are here shown as disks, are arranged in substantial vertical planes extending transversely of the vehicle to which the device is applied. They are arranged exteriorly of and at one side of the vehicle. The combined indicator and background plate *per se*, forms the subject matter of my pending application, Sr. No. 279,932, filed March 1, 1919.

In order that the device may be readily applied to the vehicle top, the shaft is made up in two sections, which are coupled together.

1 designates the shaft as a whole, which extends lengthwise of the upper part of the top of the vehicle behind the downwardly extending side portions of the fabric of the top, the shaft being supported at its front end in a bracket 3 having a clamp 4 for connection to the side rail 5 of the windshield of the vehicle. The bracket 3 is adjustable to different elevations on the side rail 5 and is provided with an upturned portion 6 formed with alined bearings 7 in which the shaft 1 or the front section thereof is mounted. The rear end of the shaft 1 extends through the crevice at one side edge of the back curtain. The shaft is supported between its ends in a bearing 8 carried by a clamp 9 adapted to be mounted on one of the bows 10 of the top.

When the indicator means is applied to permanent tops, the shaft extends through, and is supported in, eyes in the front and rear walls of the top. As here shown the shaft is composed of three sections, the front section 1ª being mounted in the bearings 7, the intermediate section 1ᵇ being detachably coupled to the rear end of the section 1ª and also to the rear section 1ᶜ by a coupling 11. Thus, by reason of the sectional shaft, when it is desired to lower the top, the rear sections 1ᵇ and 1ᶜ of the shaft can be detached and laid in the folds of the top, while the front section 1ª remains in position. The shaft is provided with a suitable handle 12 having a countersink 12ª in its front end which receives the rear end of the front section 1ª when the sections 1ᵇ and 1ᶜ are detached. The handle is attached to the shaft section 1ª or 1ᵇ in any suitable manner, as by a set screw, or by friction.

13 designates the front indicating member and 14 the rear. Each of these members includes a background in the form of a disk mounted on and rotatable with the shaft 1 and having a direction indicating character as an arrow thereon. The rear indicating member 14 also includes another indicating member or signal 15 which is normally concealed. The member 15 is here shown as a discoidal plate normally concealed behind the plate 14 and containing the word "Stop" on the margin of its rear face, the member 15 being rotatable with the shaft 1 and also movable radially thereon by gravity so that when the shaft is rotated so that the arrow points downwardly, said member 15 drops so that a portion of its margin projects beyond the lower margin of the plate 14 and exposes the word "Stop". The member 15 is here shown as formed with a slot 16 for receiving the hub 14ª of the member 14, the slot permitting the radial movement of the member 15. When the background member 15 reaches a predetermined position in its movement about its axis, in this instance when the arrow thereon points downwardly, the member 14 with the word "Stop" thereon moves radially out from behind its companion indicator member to expose the word "Stop." The radially movable member 15 is thus controlled in its movement by the movement of the member 14 and it is normally concealed by the member 14. A suitable lamp 17 connected in circuit with the electrical system of the vehicle is also carried by the plate 14. Thus the members 14, 15, and lamp 17 are carried by the shaft 1 or section 1ᶜ thereof and are not attached to the body.

The lamp 17 is arranged to throw light on the background plate in all positions thereof and the lamp arranged to throw light on all positions of a vertical combined background and indicator member forms the subject matter of my pending application, Sr. No. 279,932.

In order to arrest the movement of the shaft 1 when the arrows point in a predetermined position, an impositive lock is provided acting on the shaft 1ª and as here shown this lock consists of a spring 18 carried by the bracket 3 or arm 6 thereof and coacting with the flat sides of the squared portion or a square block 19 mounted on the shaft section 1ª between the bearings 7 on the bracket 3 or arm 6 thereof.

A suitable stop is provided for preventing undue rotation of the shaft so that the wires 20 connected to the lamp 17 will not be wound on the shaft, this stop consisting of a pin 21 projecting from the shaft section 1ª and coacting with the opposite ends of the slot or recess 22 formed in one of the bearings 7.

In applying the indicator to a folding top, the brackets 3 and bearing 8 are attached to the upright bar of the windshield and the bow 10 respectively. The shaft section 1 is then placed endwisely in the bearings and coupled together, and the lamp wires 20 connected by a plug or other detachable coupling in circuit with the tail lamp.

In applying to a permanent top, the top is first provided with eyes in its front and rear walls near the roof of the top and the shaft 1 passed through the eyes.

This direction indicator is particularly advantageous in that it is a self-contained structure which can be readily applied to the tops of motor vehicles.

What I claim is:

1. A direction indicator for motor vehicles, comprising a horizontal shaft extending lengthwise of and supported by the top of the vehicle and provided at the front and back thereof with indicator members consisting of background plates arranged in vertical transverse planes and having direction indicating characters and adapted to be rotated by the said shaft to change the position of the indicator characters on the background plate.

2. A direction indicator for motor vehicles, comprising a horizontal shaft extending lengthwise of and supported by the top of the vehicle and provided at the front and back thereof with indicator members consisting of background plates arranged in vertical transverse planes and having direction indicating characters and adapted to be rotated by the said shaft to change the position of the indicator characters on the background plate, said indicator members being arranged exteriorly of the vehicle top and the said shaft being provided interiorly the said top with coupling means adapted to permit the shaft to be separated and removed without detaching the indicating means from the shaft.

3. A direction indicator for motor vehicles comprising a horizontal shaft extending longitudinally of the vehicle, an indicator member mounted on the shaft and consisting of a background plate arranged in a transverse vertical plane and having a direction indicating character and a second indicator or signal member arranged in rear of the background plate and controlled by the movement thereof for exposing a portion of the said second indicator member in one position of the said background plate and for concealing the said second indicator member in another position of the said background plate.

4. A direction indicator for motor vehicles comprising a shaft extending longitudinally of the vehicle, an indicator member mounted on the shaft and consisting of a background plate arranged in a vertical transverse plane and having a direction indicating character, and a second indicator member consisting of a plate mounted on the shaft in rear of the said indicator member and movable radially thereon to expose a portion of the said second indicator member when the shaft and the background plate with its direction indicating character reaches a predetermined radial position.

5. A direction indicator for motor vehicles comprising a shaft, an indicator member consisting of a background plate mounted on the said shaft and having a direction indicating character and a signal plate arranged in rear of the background plate and provided with a radially arranged slot adapted to permit the signal plate to move radially to an exposed position beyond the background plate when the latter is rotated to carry its direction character to a predetermined position.

6. A direction indicator for motor vehicles including a shaft extending longitudinally of the top of the vehicle, indicator members consisting of background plates mounted on the ends of the shaft and arranged in vertical transverse planes exteriorly of the vehicle top and provided with direction indicating characters and signaling plates located in rear of the background plates and controlled by the rotary movement thereof to expose portions of the signal plate beyond the edges of the background plates when the same are rotated to carry their direction indicating characters to a predetermined position.

In testimony whereof, I have hereunto signed my name at Syracuse, in the county of Onondaga, and State of New York, this 1st day of October, 1918.

GEORGE E. BATES.